(12) United States Patent
Kobayashi et al.

(10) Patent No.: US 8,947,587 B2
(45) Date of Patent: Feb. 3, 2015

(54) IMAGING DEVICE HOLDING STRUCTURE AND IMAGING DEVICE

(75) Inventors: Hiroya Kobayashi, Hamamatsu (JP); Yasuhito Miyazaki, Hamamatsu (JP); Masaharu Muramatsu, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 724 days.

(21) Appl. No.: 12/445,630

(22) PCT Filed: Oct. 12, 2007

(86) PCT No.: PCT/JP2007/069975
§ 371 (c)(1),
(2), (4) Date: Jun. 25, 2009

(87) PCT Pub. No.: WO2008/047717
PCT Pub. Date: Apr. 24, 2008

(65) Prior Publication Data
US 2010/0188564 A1    Jul. 29, 2010

(30) Foreign Application Priority Data

Oct. 18, 2006  (JP) ................................ P2006-283956

(51) Int. Cl.
*H04N 5/222*        (2006.01)
*H04N 5/225*        (2006.01)
(52) U.S. Cl.
CPC .................................. *H04N 5/2253* (2013.01)
USPC ........................................................ 348/370
(58) Field of Classification Search
USPC ................... 348/370; 257/291–292, 458, 462
See application file for complete search history.

(56) References Cited

U.S. PATENT DOCUMENTS

| | | | | |
|---|---|---|---|---|
| 2003/0128291 A1* | 7/2003 | Harazono et al. | ............. | 348/374 |
| 2004/0150095 A1* | 8/2004 | Fraley et al. | .................. | 257/700 |
| 2005/0161703 A1 | 7/2005 | Costello | | |
| 2006/0181633 A1* | 8/2006 | Seo | ............................... | 348/340 |
| 2008/0024883 A1* | 1/2008 | Iwasaki | ........................ | 359/808 |

FOREIGN PATENT DOCUMENTS

| | | |
|---|---|---|
| CN | 1372160 A | 10/2002 |
| EP | 1653515 | 5/2006 |
| EP | 1 672 694 | 6/2006 |
| JP | 6-196680 | 7/1994 |
| JP | 2001-298104 | 10/2001 |
| JP | 2004-319791 | 11/2004 |
| JP | 2005-184468 | 7/2005 |

* cited by examiner

*Primary Examiner* — Mekonnen Dagnew
(74) *Attorney, Agent, or Firm* — Drinker Biddle & Reath LLP

(57) ABSTRACT

A holding structure 100 for an image pickup device includes a back-incident type image pickup device 1 and a holding member 51 that holds the image pickup element 1, and the image pickup device 1 has an image pickup element 11 that performs imaging and a wiring board 12 electrically connected to the image pickup element 11. The holding member 51 is freely attachably and detachably attached to a side face 27 of the wiring board 12, at each of the opposing side faces 27a, 27a in the wiring board 12, a to-be-fitted portion 28 is formed, and the to-be-fitted portion 28 and a fitting portion 54 formed at the holding member 51 are fitted together. This relieves, even when an impact is applied to the image pickup device 1 during an inspection, delivery, etc., the impact to be applied to the wiring board 12 and the image pickup element 11 by the holding member 51 while suppressing the holding member 51 from coming off. Further, handling of the image pickup device 1 is facilitated, and an unnecessary impact to be applied to the image pickup device 1 is suppressed.

12 Claims, 9 Drawing Sheets

*Fig.8*
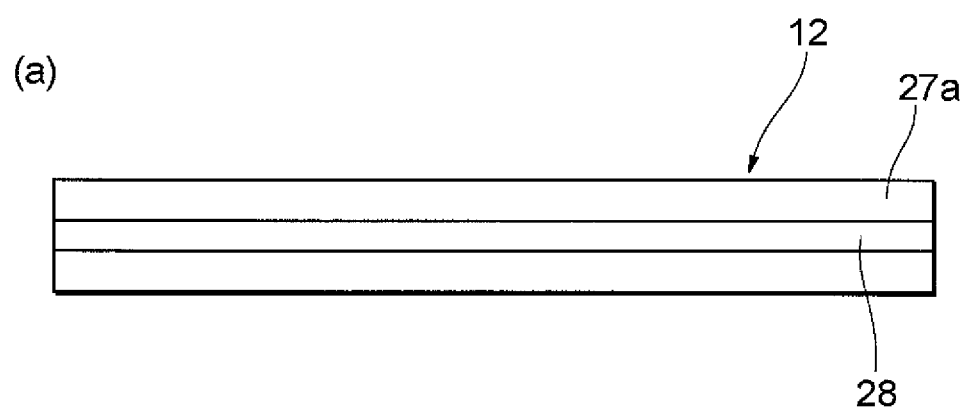
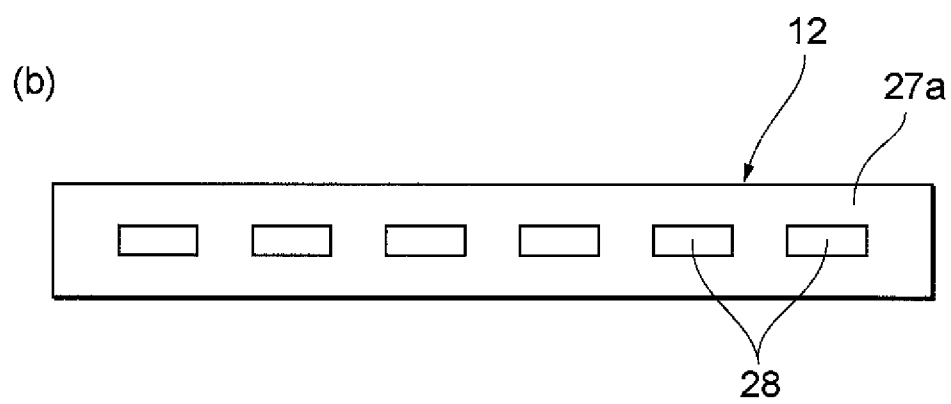

IMAGING DEVICE HOLDING STRUCTURE AND IMAGING DEVICE

TECHNICAL FIELD

The present invention relates to a holding structure for an image pickup device with a so-called back-incident type image pickup element, and an image pickup device.

BACKGROUND ART

Conventionally, so-called back-incident type image pickup elements have been known. This type of image pickup element is provided with a light-incident surface at the back surface side of a semiconductor substrate, and picks up an optical image made incident from the light-incident surface by an image pickup unit being at the front surface side. As an image pickup device with such an image pickup element, there is provided, for example, a semiconductor energy detector described in Patent Document 1. This semiconductor energy detector is provided with a BT-CCD (Back-Thinned CCD) for which a part of the semiconductor substrate is thinned on the opposite side to the image pickup unit and which is capable of imaging various types of energy beams including ultraviolet rays, soft X-rays, and electron beams at a high sensitivity and a package electrically connected with the BT-CCD by wire bonding. The back-incident type image pickup element is used as, for example, a photodetecting section of a telescope for astronomical observation.
Patent Document 1: Japanese Published Unexamined Patent Application No. H06-196680

DISCLOSURE OF THE INVENTION

Problem to be Solved by the Invention

Meanwhile, in recent years, when the image pickup device is used as, for example, a photodetecting section of a telescope for astronomical observation, a buttable arrangement structure has been adopted for increasing the resolution of the photodetecting section, where a plurality of image pickup devices are disposed in a matrix arrangement on an installation body such as a cold plate. In addition, it has been desired in the buttable arrangement structure, for reducing a region (non-sensitive region) where imaging cannot be performed, to approximate (almost equalize) a wiring board that carries an image pickup element to the area of the image pickup element as much as possible and arrange the image pickup elements on the installation body at a high density.

However, when the wiring board is approximated to the area of the image pickup element as much as possible, particularly, in the case where an impact is applied to a peripheral edge portion of the wiring board during an inspection, delivery, etc., there is a problem that the peripheral edge portion of the image pickup element is likely to be damaged. Moreover, it is common that the image pickup device is handled by only contact to the non-sensitive region so as not to contaminate or apply a load to the image pickup element. Accordingly, when the wiring board is approximated to the area of the image pickup element as much as possible, it becomes difficult to handle the image pickup device, it is likely to apply an unnecessary impact to the image pickup device, and therefore, it is likely that the peripheral edge portion of the image pickup element is damaged.

Therefore, an object of the present invention is to provide a holding structure for an image pickup device that allows preventing damage to the peripheral edge portion of an image pickup element, and an image pickup device.

Means for Solving the Problem

In order to achieve the above-mentioned object, a holding structure for an image pickup device according to the present invention includes: an image pickup device having an image pickup element that picks up an optical image made incident from one surface side by an image pickup unit being at the other surface side and a wiring board provided at the other surface side of the optical image pickup element; and a holding member freely attachably and detachably attached to a side face of the optical image wiring board so as to surround the optical image pickup element, the holding member holding the optical image wiring board, wherein a first engaging portion is formed at each of the opposing side faces in the optical image wiring board, and a second engaging portion to be engaged with the first engaging portion is formed at the holding member.

In the holding structure for an image pickup device, the holding member that holds the wiring board is freely attachably and detachably attached to the side face of the wiring board. In addition, at each of the opposing side faces in the wiring board, the first engaging portion is formed, and the first engaging portion and the second engaging portion formed at the holding member are fitted together. Thereby, the following operational effects can be obtained. That is, it becomes possible, even when an impact is applied to the image pickup device during an inspection, delivery, etc., to relieve the impact to be applied to the wiring board and the image pickup element by the holding member while suppressing the holding member from coming off. Further, since the holding member is thus freely attachably and detachably attached to the side face of the wiring board, handling of the image pickup device is facilitated, and an unnecessary impact to be applied to the image pickup device can also be suppressed. Accordingly, by the holding structure for an image pickup device according to the present invention, it becomes possible to prevent damage to the peripheral edge portion of the image pickup element.

Here, it is preferable that the first engaging portion is recessed and the second engaging portion is projected, and the first engaging portion and the second engaging portion are fitted together. In this case, even when an impact is applied to the image pickup device during an inspection, delivery, etc., the holding member can be further suppressed from coming off. Further, since the first engaging portion is thus recessed, it also becomes possible to arrange the image pickup devices at a further high density in the buttable arrangement structure of the image pickup devices without the obstruction by the engaging portions.

Moreover, the first engaging portion may extend from one longitudinal end of the side face to the other longitudinal end, and the first engaging portion may be intermittently provided from one longitudinal end of the side face to the other longitudinal end.

Moreover, it is preferable that the wiring board is a laminate formed by laminating a plurality of substrates. In this case, by, for example, performing lamination so as to sandwich a substrate having a narrow width with substrates having wider widths, a part of the side face in the wiring board is recessed. That is, the engaging portion can be simply formed.

Moreover, it is preferable to comprise a protecting member attached to the holding member, the protecting member covering one surface of the image pickup element. In this case, the protecting member can inhibit an impact from being directly applied to the image pickup element, and makes it possible to prevent dust and dirt from adhering to the image pickup element.

Moreover, it is preferable that the protecting member includes a light transmitting region. In this case, even when the image pickup element is covered with the protecting member, an optical image can be made incident into the image pickup element from the light transmitting region.

Moreover, the image pickup device according to the present invention is an image pickup device that is held by a freely attachable and detachable holding member, including: an image pickup element that picks up an optical image made incident from one surface side by an image pickup unit being at the other surface side; and a wiring board provided at the other surface side of the image pickup element, wherein a first engaging portion for engaging with the holding member is formed at each of the opposing side faces in the wiring board.

In the image pickup device, at each of the opposing side faces in the wiring board, the first engaging portion for engaging with the holding member is formed. Therefore, when the holding member and the first engaging portion are engaged and the holding member is freely attachably and detachably attached to the side face of the wiring board, the following operational effects can be obtained. That is, it becomes possible, even when an impact is applied to the image pickup device during an inspection, delivery, etc., to relieve the impact to be applied to the wiring board and the image pickup element by the holding member while suppressing the holding member from coming off. Further, since the holding member is thus freely attachably and detachably attached to the side face of the wiring board, handling of the image pickup device is facilitated, and an unnecessary impact to be applied to the image pickup device can also be suppressed. Accordingly, by the image pickup device according to the present invention, it becomes possible to prevent damage to the peripheral edge portion of the image pickup element.

Effects of the Invention

According to the present invention, it becomes possible to prevent damage to the peripheral edge portion of an image pickup element.

BRIEF DESCRIPTION OF THE DRAWINGS

FIG. 8 (*a*) is a view showing a to-be-fitted portion in the holding structure for an image pickup device shown in FIG. 3, and (*b*) is a view showing a to-be-fitted portion according to another example in the holding structure for an image pickup device shown in FIG. 3.

DESCRIPTION OF REFERENCE NUMERALS AND SYMBOLS

Figure 1:
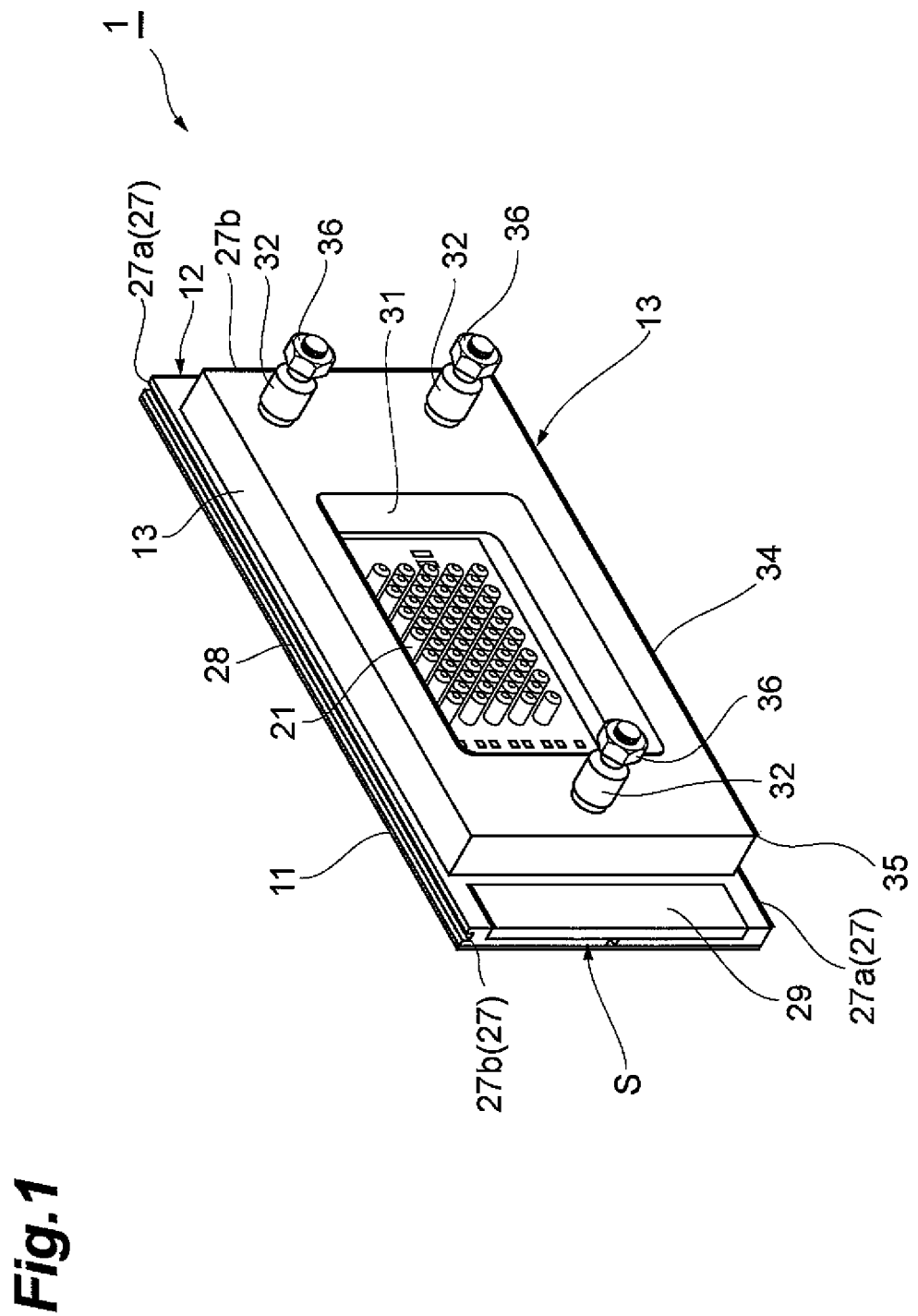
FIG. 1 A perspective view showing an image pickup device including a holding structure for an image pickup device according to one embodiment of the present invention.

1 . . . image pickup device, 11 . . . image pickup element, 12 . . . wiring board, 16 . . . CCD array (image pickup unit), 27, 27*a*, 27*b* . . . side face, 28 . . . to-be-fitted portion (first engaging portion), 51 . . . holding member, 53 . . . glass window (light transmitting region), 54 . . . fitting portion (second engaging portion), 55 . . . protecting member, 100 . . . holding structure for image pickup device.

BEST MODES FOR CARRYING OUT THE INVENTION

Hereinafter, a preferred embodiment of the present invention will be described in detail with reference to the drawings. Here, in the description of the drawings, identical elements are denoted by identical reference numerals and symbols so as to avoid overlapping descriptions.

First, prior to describing a holding structure for an image pickup device of the present embodiment, description will be given of an image pickup device included in the holding structure for an image pickup device. FIG. 1 is a perspective view showing an image pickup device included in a holding structure for an image pickup device according to one embodiment of the present invention, FIG. 2(*a*) is a front view showing an image pickup element included in the image pickup device of FIG. 1, FIG. 2(*b*) is a front view showing a wiring board included in the image pickup device of FIG. 1, and FIG. 2(*c*) is a front view showing a pin base included in the image pickup device of FIG. 1. In each figure, the image pickup device 1 has an image pickup element 11 that performs imaging, a wiring board 12 electrically connected to the image pickup element 11, and a pin base 13 used for installation of the image pickup device 1.

Figure 2:
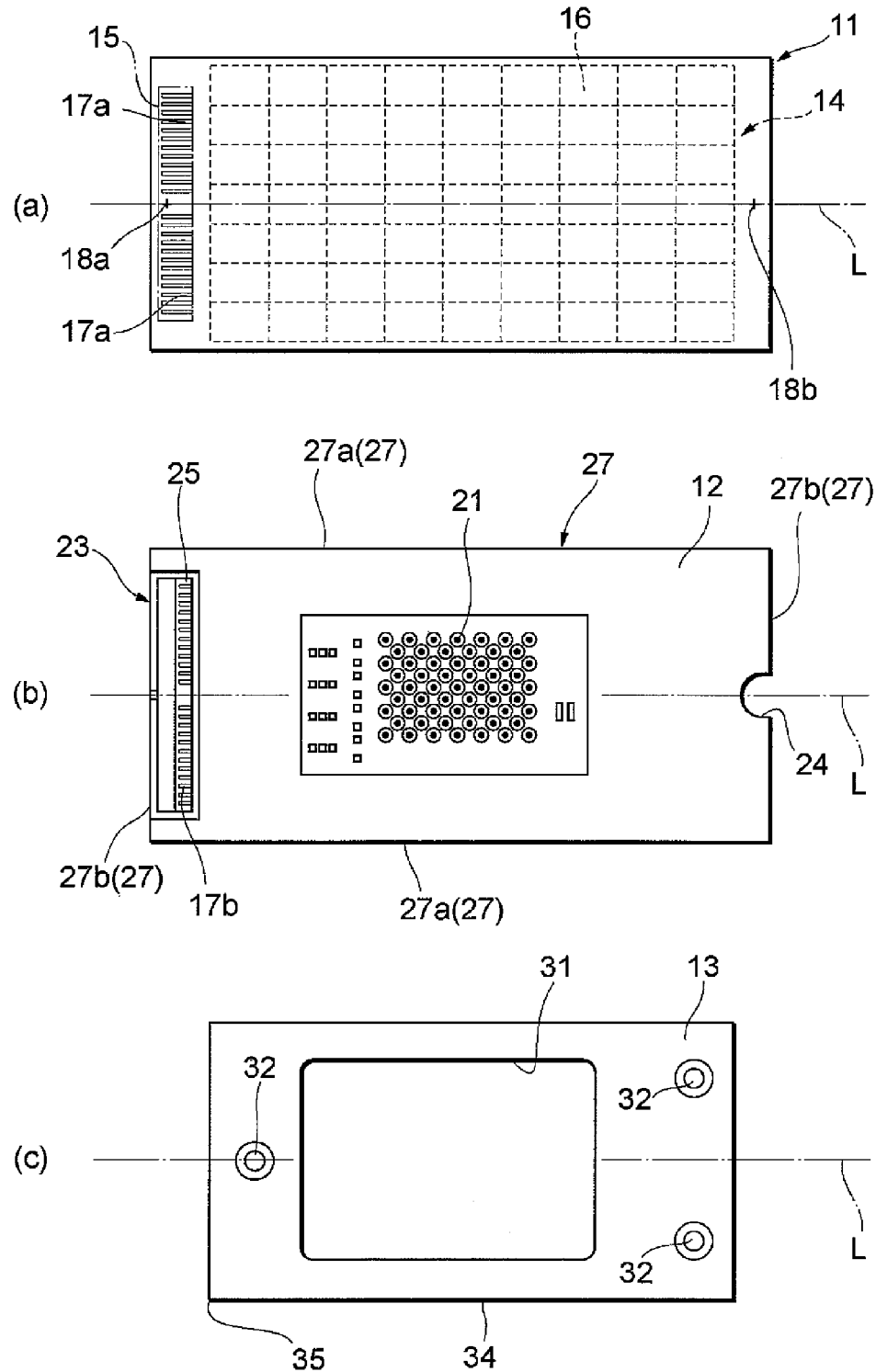
FIG. 2 (*a*) is a front view showing an image pickup element included in the image pickup device of FIG. 1, (*b*) is a front view showing a wiring board included in the image pickup device of FIG. 1, and (*c*) is a front view showing a pin base included in the image pickup device of FIG. 1.

As shown in FIG. 1 and FIG. 2(*a*), the image pickup element 11 is a Back-Thinned CCD (BT-CCD) having a thickness of approximately 200 µm. The image pickup element 11 has a light-incident surface S at its back surface (one surface) side. On the other hand, at the front surface (the other surface) side of the image pickup element 11, a detecting region 14 that detects an optical image made incident from the light-incident surface S and a first bonding pad region 15 to serve as an output terminal of the detecting region 14 are respectively provided. In the detecting region 14, provided is a CCD array (image pickup unit) 16 where CCDs are arranged in, for example, a 9×7 matrix, and in the first bonding pad region 15, provided is a first bonding pad 17*a* electrically connected with the CCD array 16 via a predetermined pattern of aluminum wiring. The first bonding pads 17*a* are arranged in a line along one end portion of the image pickup element 11.

In both end portions of the front surface of the image pickup element 11, at a dead area part on a further outer side than the detecting region 14, cross-shaped positional alignment marks 18*a*, 18*b* are respectively provided so as to pass through a center line L of the image pickup element 11. The positional alignment marks 18*a*, 18*b* are formed simultaneously with the above-described aluminum wiring by, for example, sputtering of aluminum, and used as positional references that indicate the center line L of the image pickup element 11.

As shown in FIG. 1 and FIG. 2(b), the wiring board 12 shows a rectangular shape as a plane shape observed from its thickness direction, and is, for example, a laminate that is constructed by laminating and sintering green sheets (substrates). The area of the wiring board 12 is approximated to that of the image pickup element 11 as much as possible so as to be almost the same area as that of the image pickup element 11. Here, the wiring board 12 has a width that is larger than the width of the image pickup element 11 by approximately 50 μm (25 μm at one side).

In side faces 27a, 27a at the long sides of the wiring board 12, respectively formed are recessed to-be-fitted portions (first engaging portions) 28, with which a holding member to be described later is fitted. Concretely, the to-be-fitted portion 28 extends from one longitudinal end of the side faces 27a, 27a at the long side of the wiring board 12 to the other longitudinal end. The to-be-fitted portion 28 is formed by laminating and sintering in a manner of sandwiching a green sheet having a narrow width in the short-side direction with green sheets having wider widths. Thereby, the to-be-fitted portions 28 are formed simply and reliably.

In one end portion and the other end portion of the wiring board 12, a slit portion 23 and a cutaway portion 24 are provided, respectively. The slit portion 23 is formed in an oblong shape along one end portion of the wiring board 12, and the cutaway portion 24 is formed in a semicircular shape at almost the center of the other end portion of the wiring board 12. In addition, the wiring board 12 is, while being positioned so that the first bonding pad region 15 and the positional alignment mark 18a (see FIG. 2(a)) are exposed from the slit portion 23 and the positional alignment mark 18b (see FIG. 2(a)) is exposed from the cutaway portion 24, firmly fixed to the front surface side of the image pickup element 11 by, for example, die-bonding. Moreover, the wiring board 12 is attached with a ceramic lid portion 29 from the front surface side of the slit portion 23. By attaching the lid portion 29, the first bonding pads 17a and second bonding pads 17b are protected so as not to be externally exposed. In addition, FIG. 2(b) shows a state where the lid portion 29 has been detached.

In an almost central part of the front surface side of the wiring board 12, a lead terminal 21 electrically connected to the second bonding pad 17b and corresponding to each CCD of the CCD array 16 is disposed. The lead terminal 21 is, for example, connected with a flexible PCB (Printed Circuit Board), and is externally connector-connected via the flexible PCB.

As shown in FIG. 1 to FIG. 2(c), the pin base 13 is formed of, for example, aluminum nitride in a flat rectangular parallelepiped shape. The pin base 13 is formed at almost the center with a rectangular opening portion 31 to expose the lead terminals 21 of the wiring board 12. Moreover, at the front surface side of the pin base 13, provided is a threaded fitting pin 32 made of, for example, titanium onto which a nut 36 can be screwed. A total of three threaded fitting pins 32 are provided in a manner sandwiching the opening portion 31, that is, one at the center of one end side of the pin base 13 and one each at positions close to both corner portions of the other end side of the pin base 13.

Of the side faces of the pin base 13, one side face 34 along the center line L of the image pickup element 11 and a corner portion 35 of one end side in the side face 34 serve as a positioning portion of the pin base 13. The threaded fitting pins 32 are attached at the front surface side of the pin base 13 so as to be centered based on relative distances from the side face 34 and the corner portion 35 and positioned at a high accuracy with respect to the positioning portion, respectively. Moreover, the pin base 13 is accurately angularly aligned with respect to the image pickup element 11 by aligning, with the center line L, the line of the side face 34 when the pin base 13 is observed from the front surface side, and is accurately positionally aligned with respect to the image pickup element 11 based on relative distances between the positional alignment marks 18a and 18b (see FIG. 2(a)) and the corner portion 35. In this state, the pin base 13 is firmly adhered to the front surface side of the wiring board 12 by, for example, a thermosetting resin.

Figure 3:
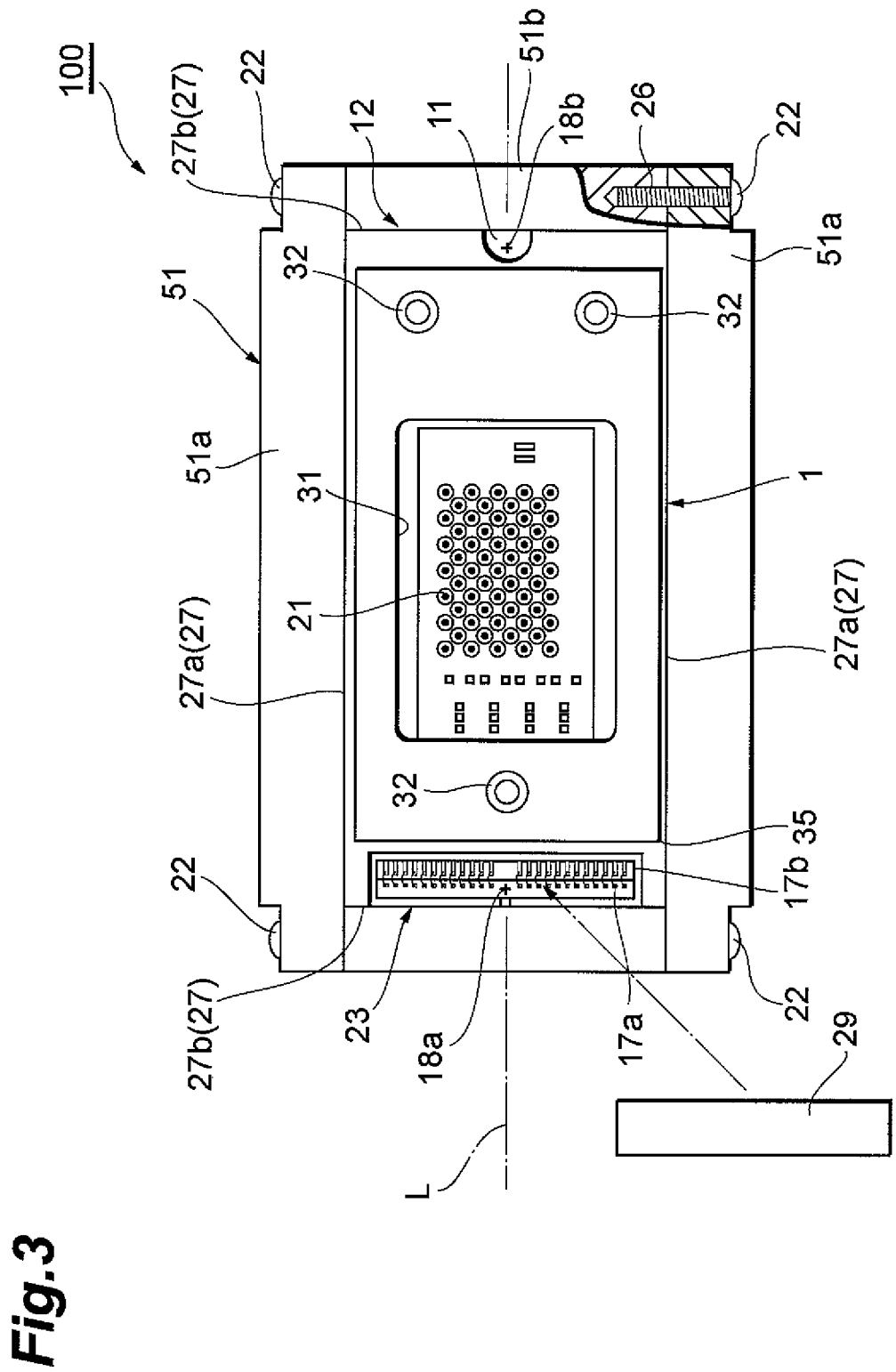
FIG. 3 A front view showing a holding structure for an image pickup device according to one embodiment of the present invention.
Figure 4:
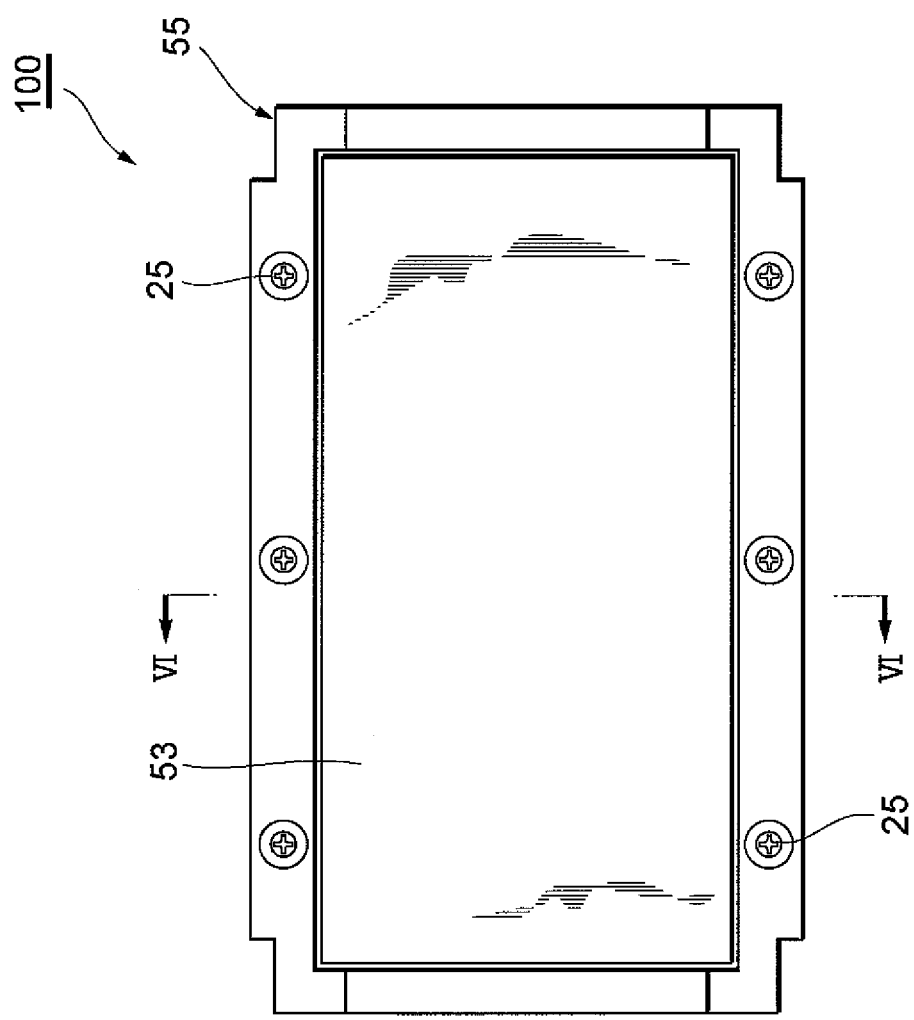
FIG. 4 A rear view showing the holding structure for an image pickup device shown in FIG. 3.
Figure 5:
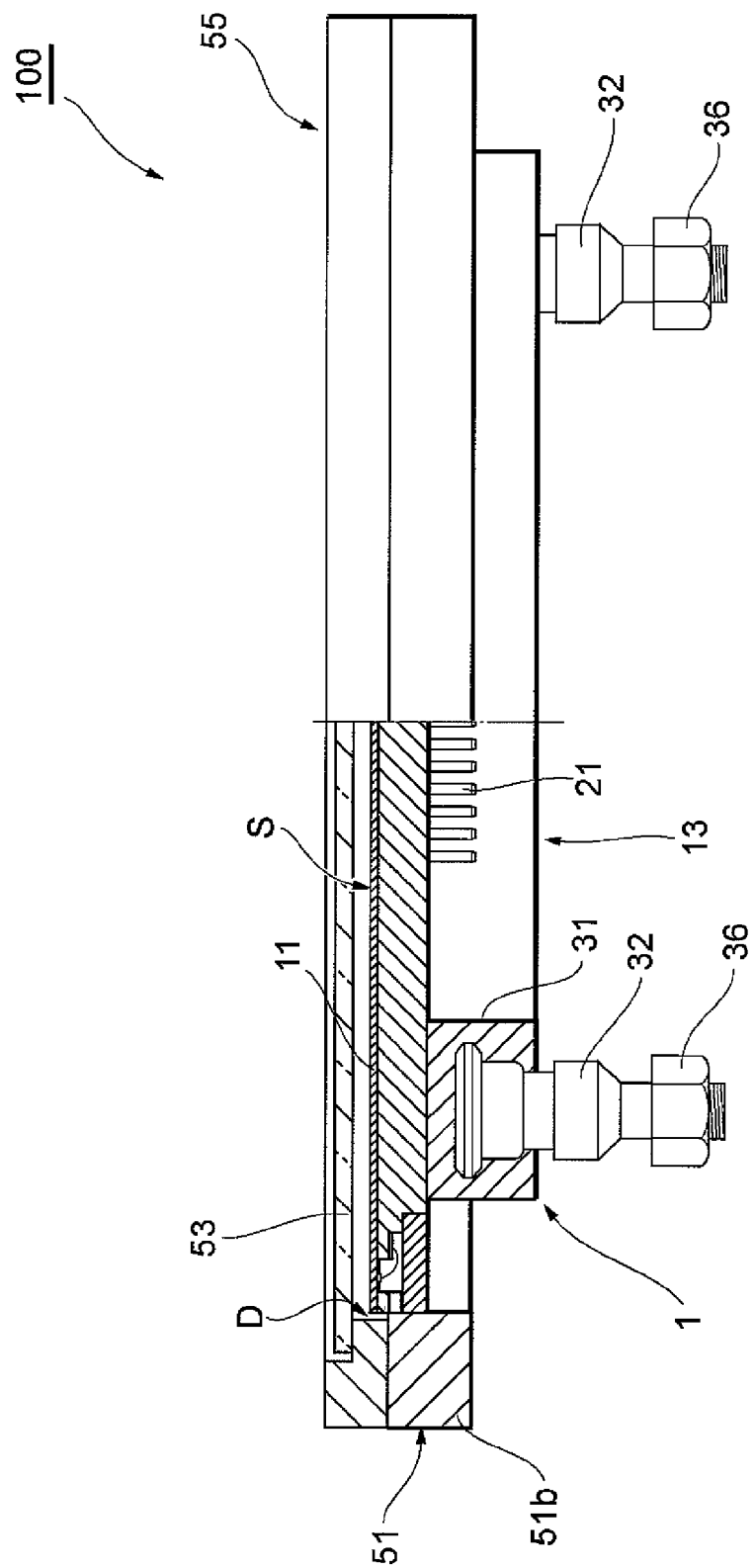
FIG. 5 A side view showing a part of the holding structure for an image pickup device shown in FIG. 3 in a sectioned manner.

Next, description will be given of a holding structure for an image pickup device of the present embodiment including the above-described image pickup device 1. FIG. 3 is a front view showing a part of an image pickup device according to one embodiment of the present invention in a sectioned manner, FIG. 4 is a rear view showing the holding structure for an image pickup device shown in FIG. 3, and FIG. 5 is a side view showing a part of the holding structure for an image pickup device shown in FIG. 3 in a sectioned manner. In each figure, the holding structure 100 for an image pickup device includes the above-mentioned image pickup device 1 and a holding member 51 that holds the image pickup device 1.

As shown in FIG. 3 to FIG. 5, the holding member 51 is made of, for example, aluminum, and has an almost frame shape such as to surround the image pickup element 11. The holding member 51 is constructed including a pair of long-side holding members 51a that abut against the side faces 27a of the long sides of the wiring board 12 and a pair of short-side holding members 51b that abut against side faces 27b of the short sides. In the long-side holding member 51a and the short-side holding member 51b, screw holes 26 leading from both longitudinal end portions of the long-side holding member 51a to the short-side holding members 51b are formed. In addition, the long-side holding member 51a and the short-side holding member 51b are fixed to each other by attachable and detachable screws 22. These make the holding member 51 freely attachable and detachable with respect to the image pickup element 1.

To the holding member 51, a protecting member 55 is freely attachably and detachably fixed by a screw 25 (see FIG. 4). Concretely, the protecting member 55 is laminated to the light-incident surface S side of the holding member 51. The protecting member 55 shows, when this is observed from the light-incident surface S side, an almost rectangular shape corresponding to an outer edge of the holding member 51. The protecting member 55 covers the light-incident surface S of the image pickup element 11 to protect the light-incident surface S. Also, as shown in FIG. 5, there provided between an inner surface of the protecting member 55 and the side face 27 of the wiring board 12 is a gap D, and the gap prevents the protecting member 55 from contacting with the image pickup element 11 on the wiring board 12 to damage the image pickup element 11. In addition, the protecting member 55 is provided with a glass window portion (light transmitting region) 53 having optical transparency and made of, for example, glass.

Figure 6:
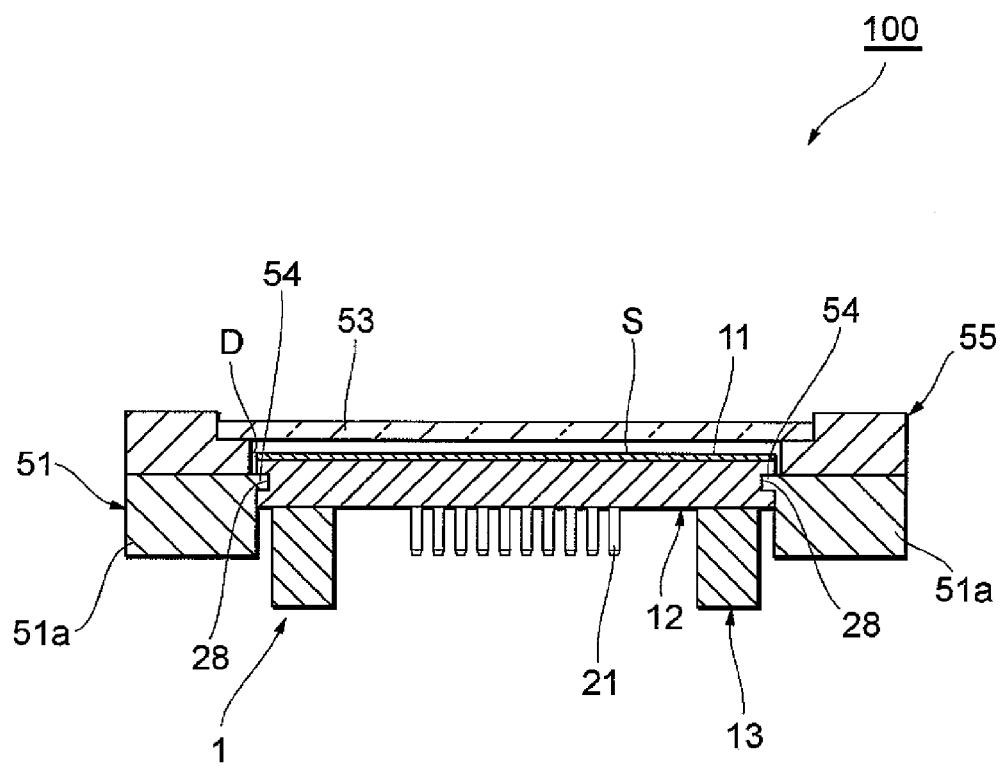
FIG. 6 A sectional view along a line VT-VT in FIG. 4.
Figure 7:
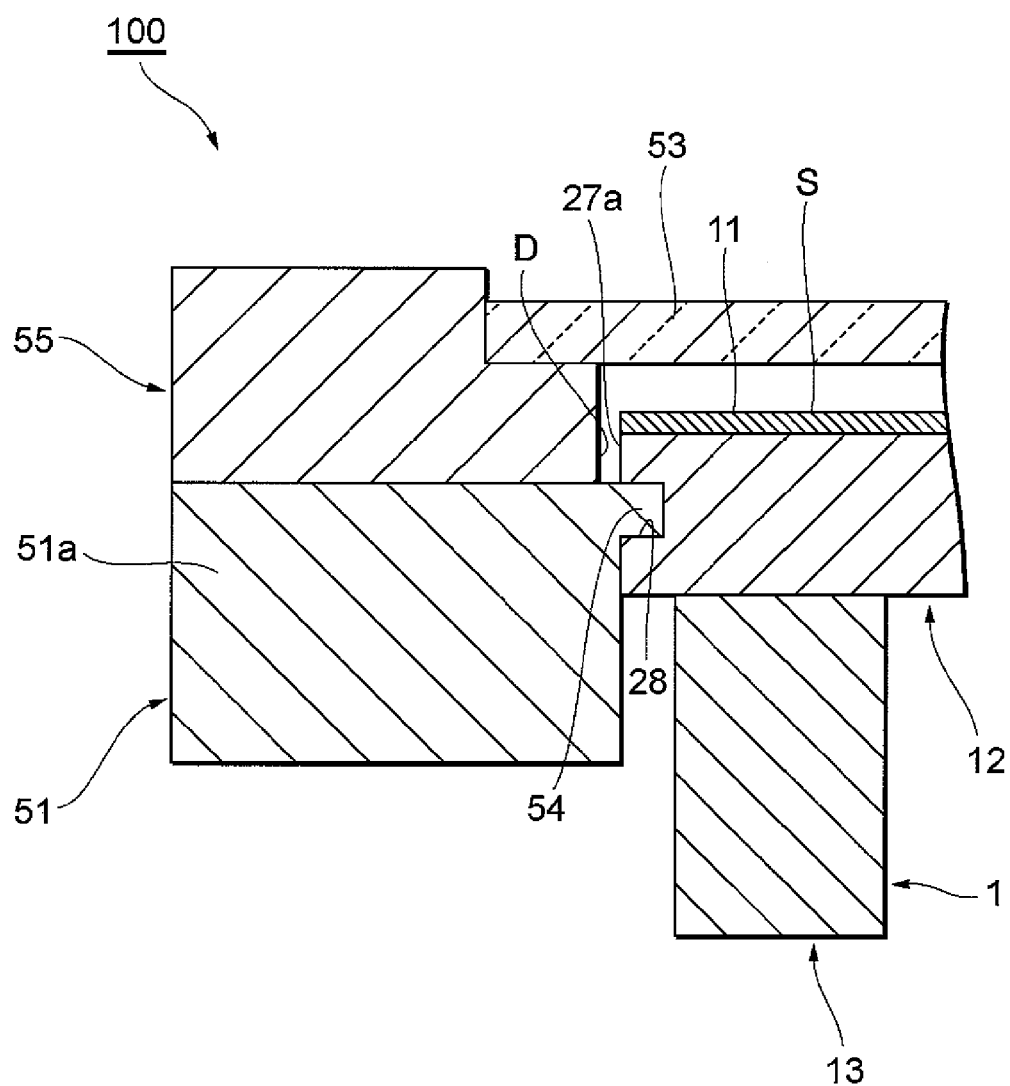
FIG. 7 A side view showing a part of the holding structure for an image pickup device shown in FIG. 6 in an enlarged manner.

Meanwhile, in the holding structure 100 for an image pickup device, as described above, formed at the side faces 27a of the long sides of the wiring board 12 in the image pickup device 1 are recessed to-be-fitted portions 28 (see FIG. 1) extending from one longitudinal end of the side face 27a to the other longitudinal end, respectively. As shown in FIG. 6 and FIG. 7, the to-be-fitted portion 28 has a depth of, for example, approximately 700 μm and has a recessed form that is recessed toward the wiring board 12, and a bottom portion of the to-be-fitted portion 28 is formed so as to be located at the center in the thickness direction of the wiring board 12. In other words, the to-be-fitted portion 28 is a groove such as to be located, in the side face 27a of the long side of the wiring board 12, at the center in the thickness direction thereof. This allows suppressing a so-called chipping phenomenon where both end portions in the thickness direction of the wiring board 12 in the side face 27a of the long side of the wiring board 12, that is, parts to construct side walls of the recessed to-be-fitted portion 28, chip due to impact.

In addition, the holding member 51 has a fitting portion (second engaging portion) 54 to be fitted with the to-be-fitted portion 28. Concretely, in the long-side holding member 51a of the holding member 51, formed at an end portion of the light-incident surface S side thereof, a projection-shaped fitting portion 54 protruding to the wiring board 12 side. The fitting portion 54, so as to correspond to the to-be-fitted portion 28, extends from one longitudinal end of the long-side holding member 51a to the other longitudinal end.

Although, in the present embodiment, as shown in FIG. 8(a), the first engaging portion is provided as the to-be-fitted portion 28 extending from one longitudinal end to the other longitudinal end at the side face 27a of the long side of the wiring board 12, as another example, there is also a case where, as another example, as shown in FIG. 8(b), the first engaging portion is provided as a to-be-fitted portion 28b that is intermittently provided from one longitudinal end to the other longitudinal end. In this case as well, the to-be-fitted portion can be simply formed by, for example, laminating green sheets. Also, in this case, a fitting portion of the holding member is, so as to correspond to the to-be-fitted portion 28b, intermittently provided from one longitudinal end of the long-side holding member to the other longitudinal end. Further, the first engaging portion may even be partially provided at the side face of the long side of the wiring board. Moreover, a fitting structure where the to-be-fitted portion is formed in a V-shape may of course be provided.

Next, description will be given of an assembling process of the holding structure 100 for an image pickup device. When the holding structure 100 for an image pickup device is assembled, first, the wiring board 12 is prepared, the short-side holding members 51b are respectively attached to the side faces 27b of the short sides of the wiring board 12, and the to-be-fitted portions 28 and the fitting portions 54 are respectively fitted together to respectively attach the long-side holding members 51a to the side faces 27a of the long sides of the wiring board 12. Then, the long-side holding members 51a and the short-side holding members 51b are fixed by the screws 22, and the holding member 51 is mounted to the wiring board 12.

Then, while being positioned so that the first bonding pad region 15 and the positional alignment mark 18a are exposed from the slit portion 23 and the positional alignment mark 18b is exposed from the cutaway portion 24, the wiring board 12 is fixed to the front surface side of the image pickup element 11 by die-bonding. After the fixation is completed, the protecting member 55 is attached to the holding member 51 so as to cover the light-incident surface S of the image pickup element 11.

Then, so that the lead terminals 21 of the wiring board 12 are exposed from the opening portion 31 being at almost the center of the pin base 13, the pin base 13 is laid over the front surface side of the wiring board 12. At this time, the line of the side face 34 when the pin base 13 is observed from the front surface side is aligned with the center line L passing through the positional alignment marks 18a, 18b of the image pickup element 11 exposed from the slit portion 23 and the cutaway portion 24 of the wiring board 12 to accurately angularly align the pin base 13 with respect to the image pickup element 11.

Then, based on the relative distances between the positional alignment marks 18a and 18b and the corner portion 35, the pin base 13 is accurately positionally aligned with respect to the image pickup element 11, and the pin base 13 is fixed to the front surface side of the wiring board 12 by adhesion. Lastly, the first bonding pads 17a and the second bonding pads 17b are mutually electrically connected by bonding wires, and thereby, the assembly of the holding structure 100 for an image pickup device is completed. Thereafter, the holding structure 100 for an image pickup device that has been assembled is transferred to, for example, a later shipping test or shipping process.

Figure 9:
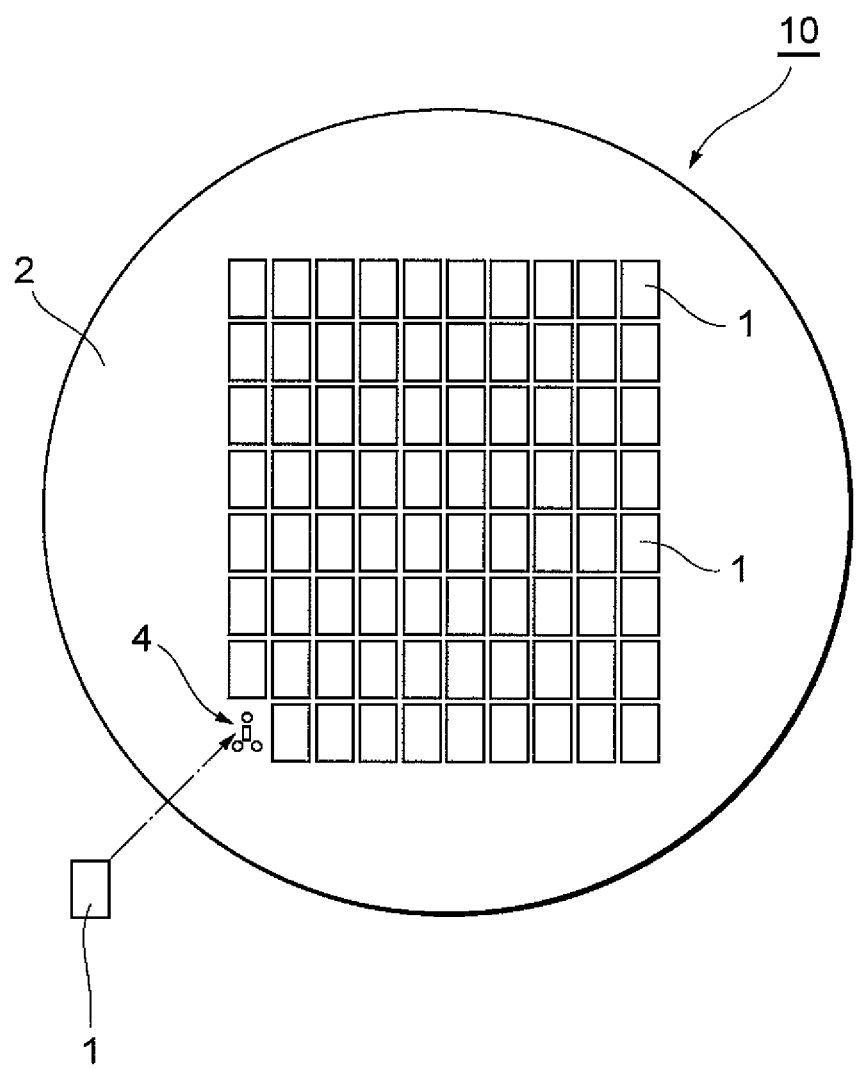
FIG. 9 A view showing a photodetecting section with the image pickup device shown in FIG. 1 loaded.

Here, as shown in FIG. 9, there is a case where the image pickup device 1 is used as, for example, a photodetecting section 10 of a telescope for astronomical observation. The photodetecting section 10 includes a thermal control cold plate 2 and a plurality of image pickup devices 1. The cold plate 2 is formed of, for example, copper in a disk shape, and is cooled to approximately −100° C. in a predetermined gas ambient when the telescope is used. In the surface of the cold plate 2, a plurality of hole portions 4 corresponding to a threaded fitting pin 32 of each image pickup device 1 are provided. Each image pickup device 1 is fixed to the cold plate 2 by fitting each threaded fitting pin 32 into the hole portion 4 and screwing a nut 36 on the threaded fitting pin 32 from the back side of the cold plate 2.

In this photodetecting section 10, the image pickup devices 1 are arranged in, for example, an 8×10 matrix. Such an arrangement is called a 4-side buttable arrangement since four side faces of each image pickup device 1 face the side faces of adjacent image pickup devices 1, and is suitable for increasing the resolution of the photodetecting section. Moreover, the interval between the adjacent image pickup devices 1 is provided as approximately 100 μm, thereby preventing contact of the image pickup devices 1 with each other due to thermal expansion after cooling by the cold plate 2 is cancelled. Further, in the photodetecting section 10, as described above, the area of the wiring board 12 is approximated to that of the image pickup element 11 as much as possible so that the image pickup elements 11 are arranged on the installation body at a high density, and thus the non-sensitive region is reduced.

At this time, particularly, when the wiring board 12 is approximated to the area of the image pickup element 11 as much as possible, in the case where an impact is applied to a peripheral edge portion of the wiring board 12 during an inspection, delivery, etc., the peripheral edge portion of the image pickup element 11 is likely to be damaged. Therefore, according to the holding structure 100 for an image pickup device, as has been described above, the holding member 51 that holds the wiring board 12 is freely attachably and detachably attached to the side face 27 of the wiring board 12, and at each of the side faces 27a of the long sides in the wiring board 12, the to-be-fitted portion 28 is formed. In addition, as described above, the to-be-fitted portion 28 and the fitting portion 54 formed at the holding member 51 are fitted together. Accordingly, it becomes possible, even when an impact is applied to the image pickup device 1 during an inspection, delivery, etc., to relieve the impact to be applied to the wiring board 12 and the image pickup element 11 by the holding member 51 while suppressing the holding member 51 from coming off.

Further, since the holding member 51 is thus freely attachably and detachably attached to the side face 27 of the wiring board 12, handling of the image pickup device 1 is facilitated, and an unnecessary impact to be applied to the image pickup device 1 can also be suppressed. In general, the image pickup device 1 is handled by only contact of the non-sensitive region so as not to contaminate or apply a load to the image pickup element 11. Accordingly, when the area of the wiring board 12 is approximated to that of the image pickup element 11 as much as possible and the part that can contact during handling is small, the above-mentioned effect of the holding member 51 becomes particularly remarkable. Accordingly, it becomes possible to further prevent damage to the peripheral edge portion of the image pickup element 11.

Moreover, in the holding structure 100 for an image pickup element of the present embodiment, as described above, the to-be-fitted portion 28 is recessed, and thus the image pickup devices 1 can be arranged at a further high density without the buttable arrangement structure being obstructed by adjacent image pickup devices 1.

Moreover, as described above, the light-incident surface S of the image pickup element is covered with the glass window portion 53 of the protecting member 55. This allows inhibiting an impact from being directly applied to the image pickup element 11, and makes it possible to prevent dust and dirt from adhering to the image pickup element 11. Additionally, even when the light-incident surface S has been covered with the protecting member 55, an optical image can be made incident into the image pickup element 11 from the glass window portion 53 of the protecting member 55, and it becomes possible to, for example, perform a shipping test at the time of product shipment.

Moreover, as described above, in the assembling process, the holding member 51 is attached to the wiring board 12 to reliably hold the wiring board 12, and the protecting member 55 protects the image pickup element 11. That is, not only during an inspection, delivery, etc., but also in the assembling process, the holding structure 100 for an image pickup device of the present embodiment is very useful.

Further, as described above, in the holding member 51, the screw holes 26 leading from both longitudinal end portions of the long-side holding member 51*a* to the short-side holding members 51*b* are formed, and the long-side holding member 51*a* and the short-side holding member 51*b* are freely attachably and detachably fixed by the screws 22. Thereby, in comparison with the case where screw holes leading from both longitudinal end portions of the short-side holding member to the long-side holding members are formed, and these are freely attachably and detachably fixed by screws, a warp or flexure of the wiring board 12 caused because of fixation by the screws is avoided.

In the above, a preferred embodiment according to the present invention has been described in detail, the present invention is by no means limited to the above-mentioned embodiment. For example, in the above-mentioned embodiment, a fitting structure where the to-be-fitted portion 28 is formed in a recessed shape and the fitting portion 54 is formed in a projection shape has been provided, however, depending on the arrangement structure of image pickup devices, there may be provided a fitting structure where the first engaging portion is formed in a recessed shape and the second engaging portion is formed in a projection shape.

Moreover, in the above-mentioned embodiment, the to-be-fitted portion 28 has been formed by laminating substrates different in width as a preferred example, however, the first engaging portion may be formed by laminating substrates of the same width and then separately applying a process such as cutting away.

Moreover, in the above-mentioned embodiment, the to-be-fitted portion 28 has been formed, in the wiring board 12, at only the side face 27*a* of the long side, however, in addition thereto, the first engaging portion may also be formed at the side face of the short side if it is possible in terms of the strength of the wiring board. In this case as well, provided is the same effect as the above, more specifically, the effect, even when an impact is applied to the image pickup device during an inspection, delivery, etc., of relieving the impact while suppressing the holding member from coming off.

Still moreover, in the above-mentioned embodiment, the case where the image pickup devices 1 are arranged with a 4-side buttable arrangement structure has been mentioned by way of example, however, this may of course be a case where, for example, the image pickup devices 1 are arranged with a 3-side buttable arrangement structure or the like where 3 side faces of the image pickup device face the side faces of adjacent image pickup elements by being arranged in two lines.

The invention claimed is:

1. A holding structure for an image pickup device comprising:
an image pickup device having an image pickup element that picks up an optical image made incident from one surface side by an image pickup unit being at the other surface side and a wiring board provided at the other surface side of the image pickup element; and
a holding member freely attachably and detachably attached to a side face of the wiring board so as to surround the image pickup element, the holding member holding the wiring board, wherein
a first engaging portion is formed at each of the opposing side faces in the wiring board, and
a second engaging portion to be engaged with the first engaging portion is formed at the holding member,
wherein the first engaging portion and the second engaging portion are configured such that the wiring board can slide into the holding member.

2. The holding structure for the image pickup device according to claim 1, wherein the first engaging portion is recessed and the second engaging portion is projected, and the first engaging portion and the second engaging portion are fitted together.

3. The holding structure for the image pickup device according to claim 1, wherein the first engaging portion extends from one longitudinal end of the side face to the other longitudinal end.

4. The holding structure for the image pickup device according to claim 1, wherein the first engaging portion is intermittently provided from one longitudinal end of the side face to the other longitudinal end.

5. The holding structure for the image pickup device according to claim 1, wherein the wiring board is a laminate formed by laminating a plurality of substrates.

6. The holding structure for the image pickup device according to claim 1, comprising a protecting member attached to the holding member, the protecting member covering one surface of the image pickup element.

7. The holding structure for the image pickup device according to claim 6, wherein the protecting member includes a light transmitting region.

8. The holding structure according to claim 6, wherein a gap is formed between protecting member and the image pickup element.

9. An image pickup device that is held by a freely attachable and detachable holding member, comprising:
an image pickup element that picks up an optical image made incident from one surface side by an image pickup unit being at the other surface side; and a wiring board provided at the other surface side of the image pickup element, wherein a first engaging portion for engaging with a second engaging portion of the holding member is formed at each of the opposing side faces in the wiring board, wherein the first engaging portion and the second engaging portion are configured such that the wiring board can slide into the holding member.

10. The holding structure according to claim 1, wherein the holding member includes a left side bar, a right side bar, an upper bar, and a lower bar, the upper and the lower bar each having the second engaging portion, at least one of the upper bar and the lower bar configured to be removably attached to the left and right side bars for securing the image pickup device to the holding member.

11. The image pickup device according to claim 9, wherein wiring board includes side rails for forming the first engaging portion, the first engaging portion forming a groove along a side edge of the wiring board.

12. The image pickup device according to claim 9, further comprising:

a protecting member attached to the holding member, the protecting member covering one surface of the image pickup element, wherein a gap is formed between protecting member and the image pickup element.

* * * * *